(12) United States Patent
Puliyeril et al.

(10) Patent No.: US 12,547,755 B2
(45) Date of Patent: Feb. 10, 2026

(54) TECHNIQUES FOR SECURELY EXECUTING ATTESTED CODE IN A COLLABORATIVE ENVIRONMENT

(71) Applicant: Liveramp Holdings, Inc., San Francisco, CA (US)

(72) Inventors: Anil Raju Puliyeril, Fremont, CA (US); Roopak Gupta, Fremont, CA (US); Matthew Karasick, Vashon, WA (US); Siddharth Sharma, Newark, CA (US)

(73) Assignee: LiveRamp Holdings, Inc., San Francisco, CA (US)

( * ) Notice: Subject to any disclaimer, the term of this patent is extended or adjusted under 35 U.S.C. 154(b) by 78 days.

(21) Appl. No.: 18/602,359

(22) Filed: Mar. 12, 2024

(65) Prior Publication Data
US 2024/0311505 A1    Sep. 19, 2024

Related U.S. Application Data

(60) Provisional application No. 63/490,987, filed on Mar. 17, 2023.

(51) Int. Cl.
*G06F 21/62* (2013.01)
*G06F 21/60* (2013.01)

(52) U.S. Cl.
CPC ........ *G06F 21/6227* (2013.01); *G06F 21/602* (2013.01); *G06F 21/606* (2013.01)

(58) Field of Classification Search
CPC ... G06F 21/6227; G06F 21/602; G06F 21/606
See application file for complete search history.

(56) References Cited

U.S. PATENT DOCUMENTS

| | | | |
|---|---|---|---|
| 9,781,122 B1 * | 10/2017 | Wilson | H04L 63/08 |
| 2003/0084292 A1 * | 5/2003 | Pierce | H04L 63/0823 |
| | | | 713/168 |
| 2005/0182966 A1 * | 8/2005 | Pham | G06F 21/606 |
| | | | 726/5 |

(Continued)

FOREIGN PATENT DOCUMENTS

| | | |
|---|---|---|
| AU | 2010201826 B2 * | 11/2012 |
| CN | 101547202 A * | 9/2009 |

(Continued)

*Primary Examiner* — Shahriar Zarrineh

(57) ABSTRACT

Methods, systems, and devices for data processing are described. A process orchestration layer of a data processing system may obtain an indication of code that has been approved by two or more parties of a secured sharing session. The process orchestration layer may generate a stored procedure that includes an initialization function, an output function, and a run function with the approved code. The process orchestration layer may output, to a first sub-system associated with a first party of the secured sharing session, a request that causes the first sub-system to execute the stored procedure. The process orchestration layer may receive an indication of an encrypted session token from the first sub-system in accordance with the initialization function of the stored procedure. The process orchestration layer may validate the encrypted session token and provide the validated session token to other parties of the secured sharing session.

19 Claims, 9 Drawing Sheets

(56) References Cited

U.S. PATENT DOCUMENTS

| | | | |
|---|---|---|---|
| 2007/0094503 A1* | 4/2007 | Ramakrishna | H04L 63/062 713/172 |
| 2010/0153709 A1* | 6/2010 | Thomas | H04L 9/0866 713/171 |
| 2011/0194698 A1* | 8/2011 | Asano | H04L 9/0643 380/282 |
| 2012/0311459 A1* | 12/2012 | Prudente | H04L 51/214 709/204 |
| 2013/0054960 A1* | 2/2013 | Grab | H04L 63/0876 726/17 |
| 2015/0067328 A1* | 3/2015 | Yin | H04L 63/0807 713/168 |
| 2015/0156122 A1* | 6/2015 | Singh | H04L 61/5084 370/235 |
| 2017/0006029 A1* | 1/2017 | Pedersen | H04W 12/50 |
| 2019/0372962 A1* | 12/2019 | Maria | H04L 63/108 |
| 2020/0007530 A1* | 1/2020 | Mohamad Abdul | H04W 12/084 |
| 2020/0259640 A1* | 8/2020 | Leavy | H04L 9/0841 |
| 2020/0410114 A1* | 12/2020 | Wei | H04L 67/1097 |
| 2021/0167972 A1* | 6/2021 | Zang | H04L 63/0823 |
| 2021/0352054 A1* | 11/2021 | Urian | H04L 9/0825 |
| 2022/0224684 A1* | 7/2022 | Schultz | H04W 76/11 |

FOREIGN PATENT DOCUMENTS

| | | | | |
|---|---|---|---|---|
| CN | 118963721 A | * | 11/2024 | G06F 21/6218 |
| KR | 20170111809 A | * | 10/2017 | H04L 9/14 |

* cited by examiner

TECHNIQUES FOR SECURELY EXECUTING ATTESTED CODE IN A COLLABORATIVE ENVIRONMENT

CROSS REFERENCES

The present Application for Patent claims priority to U.S. Provisional Patent Application No. 63/490,987 by Puliyeril et al., entitled "TECHNIQUES FOR SECURELY EXECUTING ATTESTED CODE IN A COLLABORATIVE ENVIRONMENT," filed Mar. 17, 2023, which is assigned to the assignee hereof and expressly incorporated by reference herein.

FIELD OF TECHNOLOGY

The present disclosure relates generally to database systems and data processing, and more specifically to techniques for securely executing attested code in a collaborative environment.

BACKGROUND

In some cloud computing systems, companies may want to share data in a secure manner, such that other companies can run approved queries on customer datasets without viewing or otherwise accessing actual customer data. For example, one company may want to extract customer insights from sales metrics (such as revenue growth, churn, conversion rate) of another company without accessing the underlying data records of the other company. To do so, some cloud service providers may enable users to run Structured Query Language (SQL) queries in a way that ensures data privacy (for example, by setting up a data clean room in which users can exchange or otherwise share aggregated and anonymized data). However, such approaches may restrict users from executing code that dynamically generates SQL queries.

DETAILED DESCRIPTION

Figure 1:
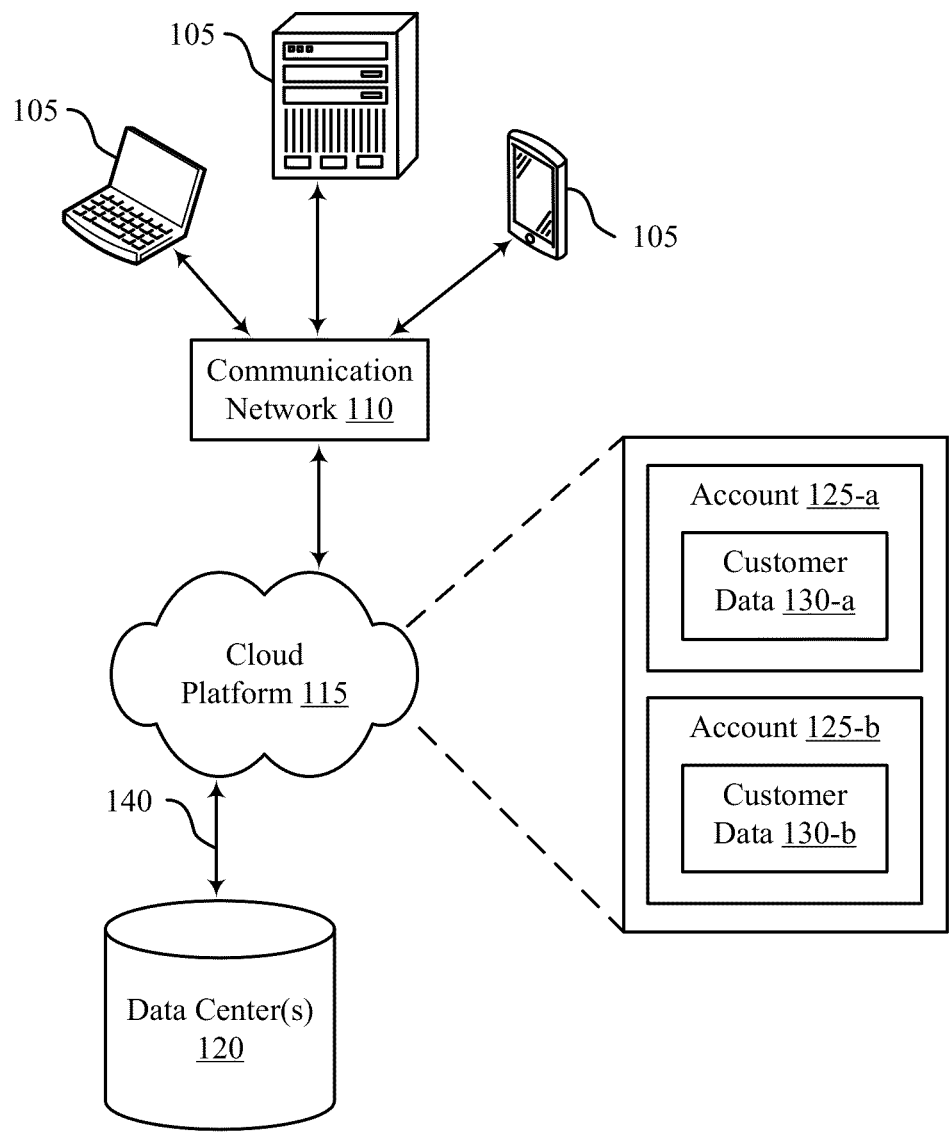
FIGS. 1 through 3 illustrate examples of data processing systems that support techniques for securely executing attested code in a collaborative environment in accordance with aspects of the present disclosure.

In some cloud computing systems, companies may want to share data in a secure manner, such that other companies can run approved queries on customer datasets without viewing or otherwise accessing actual customer data. For example, one company may want to extract customer insights from sales metrics (such as revenue growth, churn, conversion rate) of another company without accessing the underlying data records of the other company. To do so, some cloud service providers may enable users to run Structured Query Language (SQL) queries in a way that ensures data privacy (for example, by setting up a data clean room in which users can exchange or otherwise share aggregated and anonymized data). However, such approaches may restrict users from executing code that generates SQL queries, as the SQL queries may be generated dynamically.

The techniques described herein may enable cloud clients (also referred to herein as collaborators, parties, or data owners) to execute multiple queries in parallel and/or perform other processing tasks while ensuring that raw client data is not exposed to other parties in the process. In accordance with aspects of the present disclosure, a process orchestration layer of a data processing system may receive an indication of code that has been mutually approved (i.e., attested) by two or more parties in a data clean room. The process orchestration layer may generate a stored procedure that includes an initialization function, an output function, and a run function that includes the mutually approved code. Accordingly, the process orchestration layer may issue a request to a first sub-system of the data processing system associated with a first party (also referred to as an owner account) in the data clean room.

The request may cause the first sub-system to execute the initialization function of the stored procedure and return an encrypted session token back to the process orchestration layer. Upon receiving the encrypted session token from the first sub-system, the process orchestration layer may validate the encrypted session token using a secret key. Thereafter, the process orchestration layer may provide the validated token to other sub-systems of the data processing system associated with other parties (equivalently referred to as partner accounts) in the data clean room. The other sub-systems may store the validated token in a list of allowed session identifiers (IDs) associated with the data clean room. Once the token (also referred to herein as a signed session ID) is distributed to the partner accounts, the first sub-system may execute the remainder of the stored procedure (i.e., the run function and the output function), for example, by accessing one or more rows of a shared database instance and writing the result to a table.

Aspects of the present disclosure may be implemented to realize one or more of the following advantages. The techniques described herein may support improved user experience, data privacy, and query complexity by enabling collaborators to execute complex queries and/or perform additional processing on partner datasets without exposing actual data from the partner datasets. For example, the described techniques may enable collaborators in a data clean room to execute Python code that has been approved by all other collaborators in the data clean room, thereby providing data owners with a way to control who can access their data and how their data can be used. The techniques described herein may also leverage a combination of encryption techniques, secure functions, and row access policies to prevent collaborators from modifying or otherwise manipulating approved code in an unauthorized manner.

Aspects of the disclosure are initially described in the context of data processing systems, flow diagrams, and process flows. Aspects of the disclosure are further illustrated by and described with reference to apparatus diagrams, system diagrams, and flowcharts that relate to techniques for securely executing attested code in a collaborative environment.

FIG. 1 illustrates an example of a data processing system 100 that supports techniques for securely executing attested code in a collaborative environment in accordance with various aspects of the present disclosure. The data processing system 100 includes cloud clients 105, a communication network 110, a cloud platform 115, a data center 120, accounts 125, and customer data 130. The cloud platform 115 may be an example of a public or private cloud network. A cloud client 105 may access the cloud platform 115 via the communication network 110. The communication network 110 may implement transfer control protocol and internet protocol (TCP/IP), such as the Internet, or may implement other network protocols. A cloud client 105 may be an example of a user device, such as a server, a smartphone, or a laptop. In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may access the cloud platform 115 (e.g., Snowflake, Amazon Web Services, Microsoft Azure, or Google Cloud Platform) to store, manage, and process customer data 130 in accounts 125. In some cases, a cloud client 105 may have an associated security or permission level. A cloud client 105 may have access to certain applications, data, and database information within the cloud platform 115 based on the associated security or permission level, and may not have access to others. The cloud client 105 may have one or more remote software components that operate on input data and generate result data by processing, analyzing, or otherwise transforming the input data. The remote software components may also support database tracking procedures, such as streams on shared tables and views.

The cloud platform 115 may offer an on-demand database service to the cloud clients 105. In some cases, the cloud platform 115 may be an example of a multi-tenant database system. In such cases, the cloud platform 115 may serve multiple cloud clients 105 with a single instance of software. However, other types of systems may be implemented, including—but not limited to—client-server systems, mobile device systems, and mobile network systems. In some cases, the cloud platform 115 may support customer relationship management (CRM) solutions. This may include support for sales, service, marketing, community, analytics, applications, and the Internet of Things (IoT). The cloud platform 115 may receive customer data 130 from the cloud clients 105 over the communication network 110, and may store and analyze the data. In some cases, the cloud platform 115 may receive data directly from a cloud client 105. In some cases, a cloud client 105 may develop applications to run on the cloud platform 115. The cloud platform 115 may be implemented using remote servers. In some cases, the remote servers may be located at one or more data centers 120.

The data center 120 may include multiple servers. The multiple servers may be used for data storage, management, and processing. The data center 120 may receive data from the cloud platform 115 via a connection 140, or directly from a cloud client 105. The data center 120 may utilize multiple redundancies for security purposes. In some cases, data stored at the data center 120 may be backed up by copies of the data at a different data center (not pictured). The data processing system 100 includes cloud clients 105, a cloud platform 115, and a data center 120. In some cases, data processing may occur at any of the components of the data processing system 100, or at a combination of these components. In some cases, servers may perform the data processing. The servers may be a cloud client 105 or located at data center 120.

In some implementations, the data center 120 may include or utilize hard disk drives (HDDs), solid state drives (SSDs), storage clusters, Amazon S3 storage systems, or any other data storage technology. The cloud platform 115 may include distributed file systems (such as Hadoop Distributed File Systems (HDFS)), object storage systems, and the like. Computing resources of the cloud platform 115 may be virtually and/or logically partitioned into virtual warehouses, each of which may include one or more cache elements, processors, virtual machines, operation system-level container execution environments, etc. In some implementations, communication links between elements of the data processing system 100 may be implemented via one or more data communication networks, such as the communication network 110. These data communication networks may utilize any communication protocol and any type of communication medium. In some examples, the data communication networks are a combination of two or more data communication networks (or sub-networks) coupled to one another. In alternate examples, the communication links may be implemented using any type of communication medium and any communication protocol.

In some examples, the data processing system 100 may include or be an example of a multi-tenant database system. A multi-tenant database system may store data for different tenants (i.e., parties, collaborators, or accounts) in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

The cloud platform 115 may include an access management system and/or a web proxy. The access management system may enable users to create and manage users, roles, and groups, and use permissions to allow or deny access to cloud services and resources. The web proxy may handle tasks involved in accepting and processing concurrent application programming interface (API) calls, including traffic management, authorization and access control, monitoring, and API version management. The web proxy may provide Hypertext Transfer Protocol (HTTP) proxy services for creating, publishing, maintaining, securing, and monitoring APIs, such as representational state transfer (REST) APIs.

In the example of FIG. 1, the accounts 125 may be associated with different parties (i.e., collaborators) of a data sharing session. For example, a first party (e.g., Collaborator A) may have an account 125-a that includes customer data 130-a (i.e., data relating to customers of Collaborator A). The customer data 130-a may be stored in a table or other format for storing customer information and other related information. The other related information may include identifying information, such as email, and other characteristics of the customers, such as gender, geographic location, purchasing habits, and the like. For example, if the first party is a consumer-goods company, purchasing characteristics may be stored, such as whether the customer is single, married, part of a suburban or urban family, etc. If the first party is a streaming service company, information about the watching habits of customers may be stored, such as whether the customer likes action, mystery, reality, etc.

Likewise, a second party (e.g., Collaborator B) may have an account 125-b that includes customer data 130-b (i.e., data relating to customers of Collaborator B). The customer data 130-b may be stored in a table or other format for storing customer information and other related information. The other related information may include identifying information, such as email, and other known characteristics of the customers, such as gender, geographic location, purchasing habits, etc. For security and privacy reasons, the customer data 130-b may be inaccessible to the first party (and vice versa). However, the two parties may want to share at least some of their data with each other without revealing sensitive information, such as a customer's personal identity information. For example, Collaborator A and Collaborator B may want to: explore cross marketing or advertising opportunities; see how many of their customers overlap; or filter based on certain characteristics of the overlapping customers to identify relationships and patterns.

In accordance with the techniques described herein, a process orchestration layer of the cloud platform 115 may obtain (i.e., from a cloud client 105 via the communication network 110) an indication of code that has been mutually approved by two or more parties of a secured sharing session (equivalently referred to herein as a secure share or a data sharing session). The process orchestration layer of the cloud platform 115 may generate and install a stored procedure that includes an initialization function, an output function, and a run function with the mutually approved code. The process orchestration layer may issue a request to a first sub-system (e.g., the account 125-a) associated with a first party (e.g., Collaborator A) of the secured sharing session. The request may cause the first sub-system to execute at least a portion of the initialization function of the stored procedure.

The initialization function may include a call to a secure function that generates and returns an encrypted session token to the process orchestration layer of the cloud platform 115. The process orchestration layer may validate the encrypted session token by using a secret key to decrypt the encrypted session token. If the encrypted session token is valid, the process orchestration layer may provide the validated token to a second sub-system (e.g., the account 125-b) associated with a second party (e.g., Collaborator B) of the secured sharing session. Once the token is made available to the second sub-system (and to all other parties of the secured sharing session), the first sub-system may run the rest of the stored procedure (i.e., a portion of the initialization function, the run function, and the output function). The run function may, in some implementations, access one or more rows of the customer data 130-b according to the mutually approved code. The output function may store the results of the run function in a table that is accessible to the first sub-system.

It should be appreciated by a person skilled in the art that one or more aspects of the disclosure may be implemented in the data processing system 100 to solve additional or alternative problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
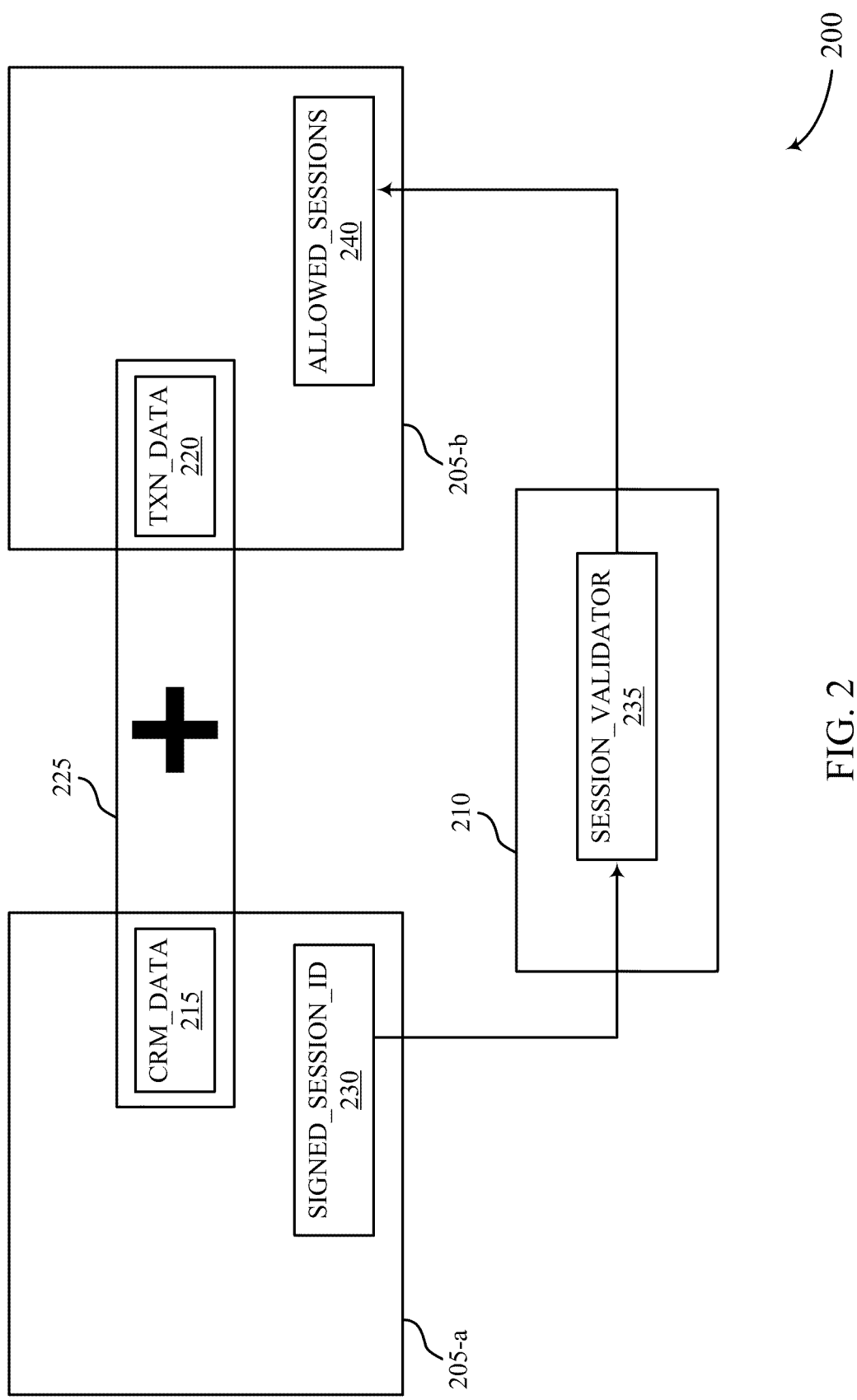

FIG. 2 shows an example of a data processing system 200 that supports techniques for securely executing attested code in a collaborative environment in accordance with aspects of the present disclosure. The data processing system 200 may implement or be implemented by aspects of the data processing system 100. For example, the data processing system 200 includes a process orchestration layer 210, which may be implemented using one or more logical and/or physical components of the cloud platform 115, as described with reference to FIG. 1. The data processing system 200 also includes a sub-system 205-a and a sub-system 205-a, which may be associated with different parties (i.e., collaborators, accounts) of a data clean room. For example, the sub-system 205-a may correspond to a first party (i.e., Owner, Collaborator A), and the sub-system 205-b may correspond to a second party (i.e., Partner, Collaborator B). The process orchestration layer 210 may facilitate a secure sharing session 225 between parties in the data clean room.

As described herein with reference to FIG. 1, the process orchestration layer 210 may obtain (i.e., from a cloud client 105, as described with reference to FIG. 1) an indication of code that has been mutually approved by all parties of the secure sharing session 225 (equivalently referred to herein as a secure share or a data sharing session). The process orchestration layer 210 may generate and install a stored procedure (such as the stored procedure 345 described with reference to FIG. 3) that includes an initialization function, an output function, and a run function with the mutually approved code. The process orchestration layer 210 may issue a request to the sub-system 205-a associated with the first party (e.g., Collaborator A) of the secure sharing session 225. The request may cause the sub-system 205-a to execute at least a portion of the initialization function of the stored procedure.

The initialization function may include a call to a secure function that generates and returns an encrypted session token 230 (SIGNED_SESSION_ID) to the process orchestration layer 210. Accordingly, a session validator 235 (SESSION_VALIDATOR) of the process orchestration layer 210 may validate the encrypted session token 230 by using a secret key to decrypt the encrypted session token 230. If the encrypted session token 230 is valid, the process orchestration layer 210 may provide the validated token to the sub-system 205-b associated with the second party (e.g., Collaborator B) of the secure sharing session 225. The sub-system 205-b may then insert the valid token into an allowed sessions table 240 (ALLOWED_SESSIONS). If the encrypted session token 230 is invalid, the process orchestration layer 210 may refrain from taking further action.

Once the token is made available to the sub-system 205-b (and all other parties in the data clean room), the sub-system 205-*a* may run the rest of the stored procedure (i.e., a portion of the initialization function, the run function, and the output function). The run function may, in some implementations, access one or more rows of a dataset 220 (e.g., TXN_DATA) associated with the sub-system 205-*b* and/or a dataset 215 (e.g., CRM_DATA) associated with the sub-system 205-*a*. The run function may access one or both of the dataset 215 and the dataset 220 according to the mutually approved code. The output function of the stored procedure may save or otherwise write the results of the run function in a table (such as a cross-reference table) that is accessible to the sub-system 205-*a*.

Aspects of the data processing system 200 may be implemented to realize one or more of the following advantages. The techniques described with reference to FIG. 2 may support improved user experience, data privacy, and query complexity by enabling collaborators (such as the sub-systems 205) to execute complex queries and/or perform additional processing on partner datasets (such as the dataset 215 or the dataset 220) without exposing actual data from the partner datasets. For example, the described techniques may enable collaborators in a data clean room to execute Python code that has been approved by all other collaborators in the data clean room, thereby providing data owners with a way to control who can access their data and how their data can be used. The techniques described herein may also leverage a combination of encryption techniques, secure functions, and row access policies to prevent collaborators from modifying or otherwise manipulating approved code in unauthorized ways.

Figure 3:
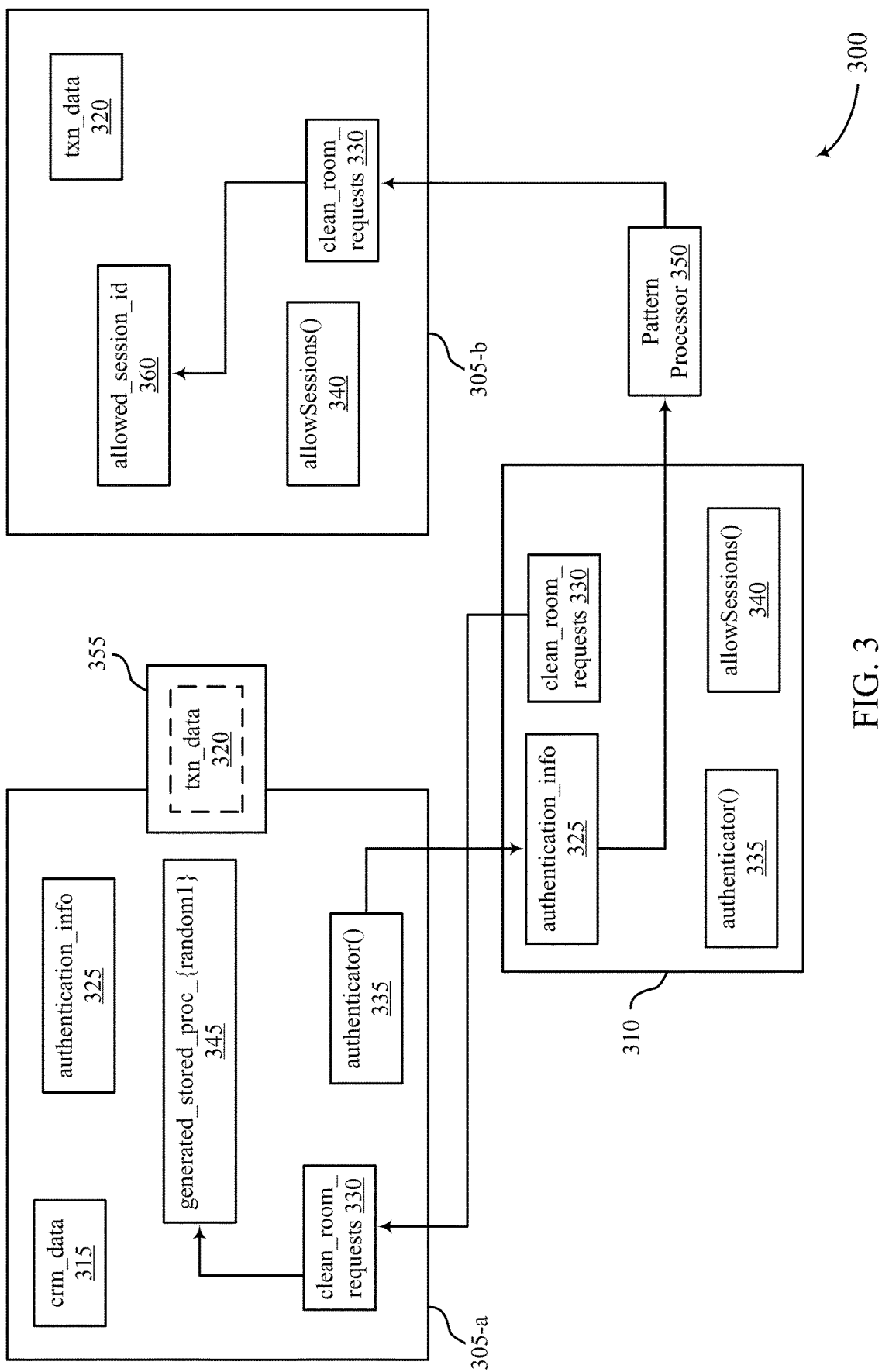

FIG. 3 shows an example of a data processing system 300 that supports techniques for securely executing attested code in a collaborative environment in accordance with aspects of the present disclosure. The data processing system 300 may implement or be implemented by aspects of the data processing system 100 or the data processing system 200. For example, the data processing system 300 includes a process orchestration layer 310, which may be implemented using one or more logical and/or physical components of the cloud platform 115, as described with reference to FIG. 1. The data processing system 300 also includes a sub-system 305-*a* and a sub-system 305-*a*, which may be associated with different parties (i.e., collaborators, accounts) of a data clean room. For example, the sub-system 305-*a* may correspond to a first party (i.e., Owner, Collaborator A), and the sub-system 305-*b* may correspond to a second party (i.e., Partner, Collaborator B). The process orchestration layer 310 may facilitate a secure sharing session between parties in the data clean room.

The data processing system 300 may be an example of a cloud-based data warehousing platform (such as Snowflake) that supports standard SQL and other data processing technologies. The data processing system 300 may offer a shared database feature that enables collaborators to share a single database instance across multiple accounts in a computing environment (such as the accounts 125 described with reference to FIG. 1), thereby permitting collaborators to share data while still maintain separate security and access controls. With shared databases, data owners can control who has access to their data and how the data can be used.

The data processing system 300 may support row access policies, a security feature that enables collaborators to control access to specific rows of data within a table based on specified conditions. With a row access policy 355, a user (such as a cloud client 105 described with reference to FIG. 1) can define a set of conditions that must be met for a query to access a particular row of a table (such as a row of the dataset 320). If a user or role does not meet the conditions specified in the row access policy 355, they will be unable to access the corresponding row of data. For example, the row access policy 355 may specify that requests to a particular view are permitted only if the query originates in a particular session. The data processing system 300 may support secure functions, which provide a way to expose code with custom logic (for example, code that, when executed, stores an encryption key) and perform operations on data without the collaborator knowing the actual transformation that occurred.

As described herein with reference to FIGS. 1 and 2, collaborators (i.e., parties) may want to share data in a privacy-safe environment, where only approved queries can be run on datasets, and none of the parties can see other parties' data. The process orchestration layer 310 may leverage various cloud computing capabilities (such as a pattern processor 350) to run SQL queries in a privacy-safe way. However, these approaches may restrict collaborators to executing a single SQL query at a time. In some cases, collaborators may want to execute approved code that runs multiple queries and/or performs other processing tasks on the data without exposing other parties' raw data.

In accordance with aspects of the present disclosure, the pattern processor 350 may use a pattern to help run code that has been approved by all parties in a secure way. The pattern is to use an approved session ID that can only execute fingerprinted (i.e., signed, encrypted) code approved by all parties in a data clean room. To support this functionality, the process orchestration layer 310 may create a stored procedure 345 with an initialization, run, and output function/method. The initialization function may generate a fingerprint of a current running environment, share the fingerprint with the process orchestration layer 310, and wait for: the session ID to be approved on partner accounts (such as the sub-system 305-*b*); the request to be cancelled; or a time out to occur. If the session is approved, the stored procedure 345 may call the run function and the output function before cleaning up the approved session.

The run function may include code that is written by clients (e.g., client-provided code). The run method takes an input variable called 'session', which corresponds to a data sharing session (e.g., a snowpark session) between two or more parties/collaborators. Any instances where table name macros are used may be replaced with corresponding clean room row access policy-enabled view names. The output method may write the results to a result table that is shared with the process orchestration layer 310. The output method may include a session and a dataframe to write as an output. The names and data types of columns in the output dataframe match dimensions and measures.

As described herein, the initialization function may include a call to an authentication token generation secure function that uses a secret key to encrypt the current session ID, the current virtual warehouse name, the current task name, the current timestamp, a secure hashing algorithm (SHA) value of the stored procedure 345 that wraps the python function, a SHA value of the task code, and a SHA value of the stored procedure 345 that will run the procedure. The process orchestration layer 310 may validate the SHA values, task names, warehouse names, and timestamps such that if a client (or a malicious actor) attempts to insert their worksheets session ID into the table, the ID would include an incorrect warehouse and/or task name. If a client attempts to modify the stored procedure 345, the SHA value of the stored procedure 345 would not match the SHA value generated by the process orchestration layer 310, thereby preventing any hacks or unauthorized modifications. The datasets (such as the dataset 320) may have a row access policy 355 that permits read access for queries if the session ID is validated.

In the example of FIG. 3, the process orchestration layer 310 may include or otherwise have access to authentication information 325 (e.g., authentication_info), clean room requests 330 (e.g., clean_room_requests), an authenticator function 335 (e.g., authenticator( )), and an allow sessions function 340 (e.g., allowSession( )). The sub-system 305-a may include or otherwise have access to a dataset 315 (e.g., crm_data), authentication information 325, a stored procedure 345 (e.g., generated_stored_proc_(random1)), clean room requests 330, and the authenticator function 335. Likewise, the sub-system 305-b may include or otherwise have access to a dataset 320 (e.g., txn_data), the allow sessions function 340, clean room requests 330, and a table of allowed session IDs 360. As described herein, the stored procedure 345 may include an initialization function (e.g., init( )), a run function (e.g., run(session)), and an output function (e.g., output(output_df)).

Aspects of the data processing system 300 may be implemented to realize one or more of the following advantages. The techniques described with reference to FIG. 3 may support improved user experience, data privacy, and query complexity by enabling collaborators (such as the sub-systems 305) to execute complex queries and/or perform additional processing on partner datasets (such as the dataset 320) without exposing actual data from the partner datasets. For example, the described techniques may enable collaborators in a data clean room to execute Python code that has been approved by all other collaborators in the data clean room, thereby providing data owners with a way to control who can access their data and how their data can be used. The techniques described herein may also leverage a combination of encryption techniques, secure functions, and row access policies (such as the row access policy 355) to prevent collaborators from modifying or otherwise manipulating approved code in unauthorized ways.

Figure 4:
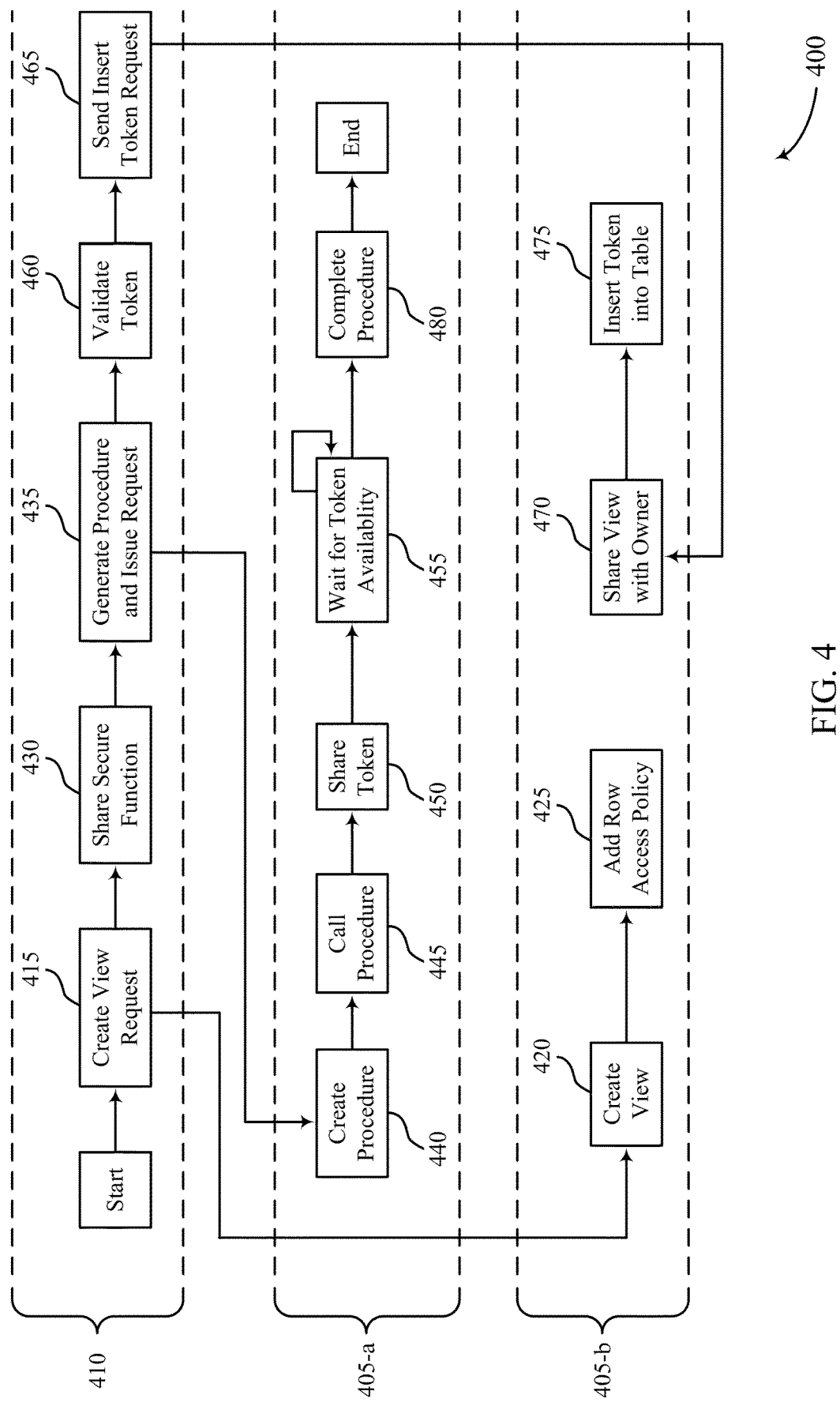
FIG. 4 shows an example of a flow diagram that supports techniques for securely executing attested code in a collaborative environment in accordance with aspects of the present disclosure.

FIG. 4 shows an example of a flow diagram 400 that supports techniques for securely executing attested code in a collaborative environment in accordance with aspects of the present disclosure. The flow diagram 400 may implement or be implemented by aspects of any of the data processing systems described with reference to FIGS. 1 through 3. For example, the flow diagram 400 includes a process orchestration layer 410, a sub-system 405-a, and a sub-system 405-b, which may be examples of corresponding elements described herein, including with reference to FIGS. 1 through 3. The process orchestration layer 410 may facilitate a secure sharing session between the sub-system 405-a and the sub-system 405-b. The sub-system 405-a may correspond to a first party (i.e., Owner, Collaborator A) in a data clean room, and the sub-system 405-b may correspond to a second party (i.e., Partner, Collaborator B) in the data clean room.

At 415, the process orchestration layer 410 may create a view request that is sent to the sub-system 405-b. At 420, the sub-system 405-b may create the requested view. At 425, the sub-system 405-b (more specifically, a cloud client associated with the sub-system 405-b) may add a row access policy (such as the row access policy 355 described with reference to FIG. 3) to the view.

At 430, the process orchestration layer 410 may share a secure function (e.g., token_generation) with one or both of the sub-systems 405. At 435, the process orchestration layer 410 may generate/install a stored procedure (such as the stored procedure 345 described with reference to FIG. 3) and send a call procedure request to the sub-system 405-a. At 440, the sub-system 405-a may create a procedure in response to the call procedure request. At 445, the sub-system 405-a may call the procedure.

At 450, the sub-system 405-a may share a token (such as the encrypted session token 230 described with reference to FIG. 2) with the process orchestration layer 410. At 455, the sub-system 405-a may wait for the token (i.e., session_id) to become available in the partner account (e.g., the sub-system 405-b).

At 460, the process orchestration layer 410 may validate the token from the sub-system 405-a using a secret encryption key that is hidden from both of the sub-systems 405. If the token is valid, the process orchestration layer 410 may send an insert token request to the partner account (e.g., the sub-system 405-b) at 465. Checking the token may help ensure that the client dataset(s) are only accessed by approved (i.e., attested) code running in the secured sharing session.

Accordingly, at 470, the sub-system 405-a may share the view with the owner account (e.g., the sub-system 405-a). At 475, the sub-system 405-b may insert the token into a table of allowed session IDs (such as the table of allowed session IDs 360 described with reference to FIG. 3). At 480, the sub-system 405-a may complete the rest of the procedure.

Figure 5:
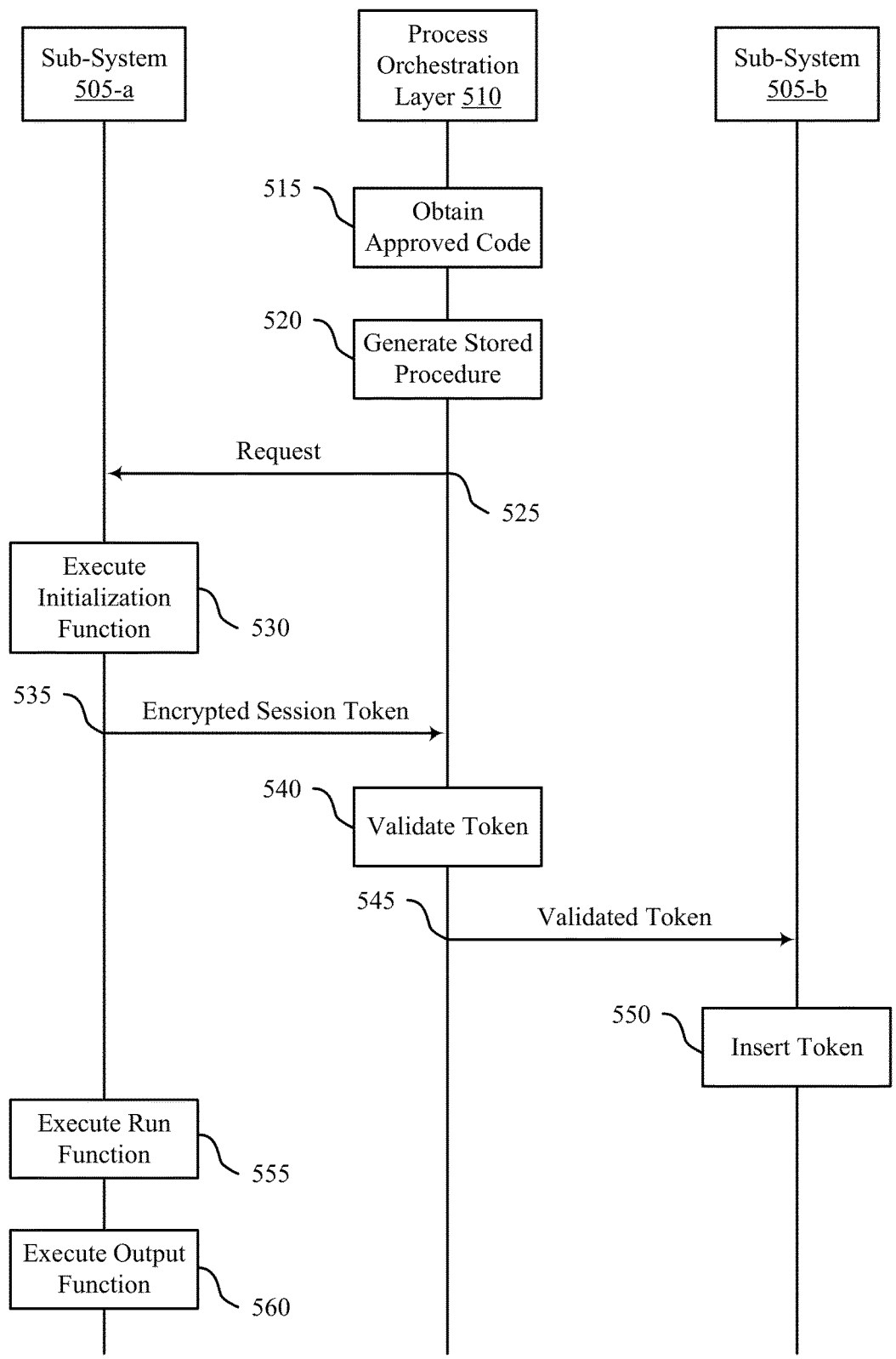
FIG. 5 shows an example of a process flow that supports techniques for securely executing attested code in a collaborative environment in accordance with aspects of the present disclosure.

FIG. 5 shows an example of a process flow 500 that supports techniques for securely executing attested code in a collaborative environment in accordance with aspects of the present disclosure. The process flow 500 may implement or be implemented by aspects of any of the data processing systems or flow diagrams described with reference to FIGS. 1 through 4. For example, the process flow 500 includes a process orchestration layer 510, a sub-system 505-a (i.e., an owner account), and a sub-system 505-b (i.e., a partner account). As described herein, the sub-systems 505 may correspond to parties (e.g., collaborators) in a data clean room. In the following description of the process flow 500, operations between the process orchestration layer 510 and the sub-systems 505 may be added, omitted, or performed in a different order (with respect to the exemplary order shown).

As described herein, the process orchestration layer 510 may be installed on all of the sub-systems 505 using a native application, a Python command-line interface (CLI), or any other process of sharing orchestration code. At 515, the process orchestration layer 510 may obtain code that has been mutually approved by all parties in the data clean room (i.e., both of the sub-systems 505). In some examples, the code may be written using a high-level programming language, such as Python.

At 520, the process orchestration layer 510 may generate a stored procedure (such as the stored procedure 345 described with reference to FIG. 3) that includes an initialization function, a run function, and an output function. At 525, the process orchestration layer may issue a call procedure request to the sub-system 505-a, thereby causing the sub-system 505-a to execute the stored procedure.

At 530, the sub-system 505-a may execute the initialization function of the stored procedure. As described herein, the initialization function may include a call to a secure function that generates an encrypted session token (i.e., a signed session ID) based on parameters and attributes of the stored procedure, the sub-system 505-a, etc. For example, the secure function may use a SHA to generate a hash value associated with the stored procedure that wraps the Python code, a hash value associated with a task code, or a hash value associated with the stored procedure that runs the procedure. The secure function may encrypt these hash values along with the current session ID, the current warehouse name, the current task name, and the current timestamp.

At 535, the secure token generation function may share the encrypted session token with the process orchestration layer 510. At 540, the process orchestration layer may validate the token provided by the sub-system 505-a, for example, by using a secret key to decrypt the encrypted session token. If the token is valid (i.e., if all elements of the decrypted token match with corresponding elements generated by the process orchestration layer 510), the process orchestration layer 510 may provide the token to the sub-system 505-b at 545. The process orchestration layer 510 may also provide the token to all other parties in the data clean room. Accordingly, at 550, the sub-system 505-b may insert the token into a list of allowed session IDs (e.g., the table of allowed session IDs 360 described with reference to FIG. 3).

Once the token (i.e., session ID) is made available to the sub-system 505-b, the sub-system 505-a may complete the rest of the stored procedure, for example, by executing the rest of the initialization function (which includes calls to the run function and the output function). At 555, the sub-system 505-a may execute the run function of the stored procedure, which includes the mutually approved client-provided code. The run function may access one or more rows of dataset(s) from the sub-system 505-b and/or the sub-system 505-a according to one or more row access policies configured for the dataset(s). At 560, the sub-system 505-a may execute the output function of the stored procedure, which stores/writes the results of the run function to a client table shared with the process orchestration layer 510.

Figure 6:
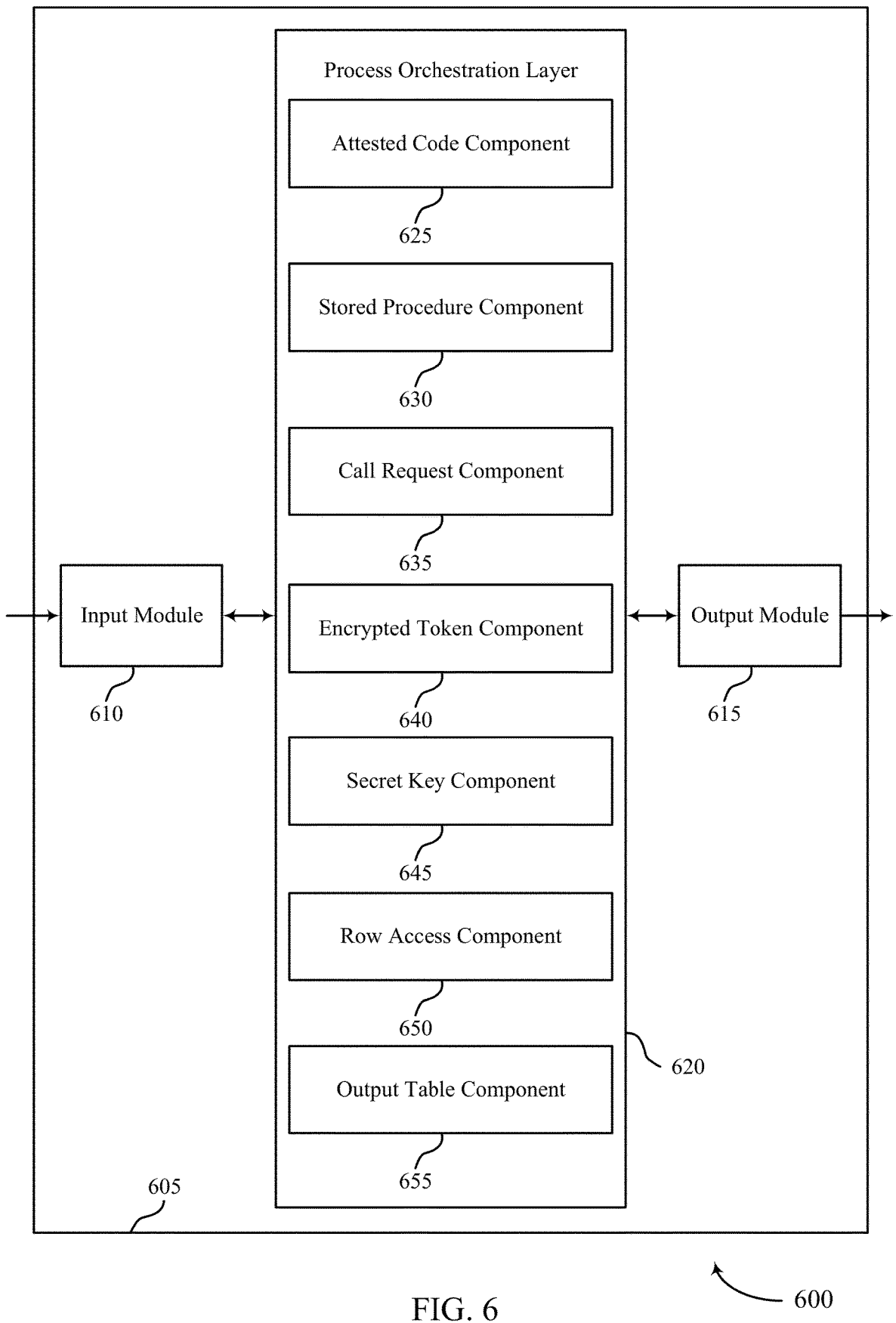
FIG. 6 shows a block diagram of an apparatus that supports techniques for securely executing attested code in a collaborative environment in accordance with aspects of the present disclosure.

FIG. 6 shows a block diagram 600 of a device 605 that supports techniques for securely executing attested code in a collaborative environment in accordance with aspects of the present disclosure. The device 605 may include an input module 610, an output module 615, and a process orchestration layer 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the process orchestration layer 620 to support techniques for securely executing attested code in a collaborative environment. In some cases, the input module 610 may be a component of an I/O controller 810, as described with reference to FIG. 8.

The output module 615 may manage output signals for the device 605. For example, the output module 615 may receive signals from other components of the device 605, such as the process orchestration layer 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810, as described with reference to FIG. 8.

For example, the process orchestration layer 620 may include an attested code component 625, a stored procedure component 630, a call request component 635, an encrypted token component 640, a secret key component 645, a row access component 650, an output table component 655, or any combination thereof. In some examples, the process orchestration layer 620, or various components thereof, may be configured to perform various operations (e.g., receiving, monitoring, transmitting) using or otherwise in cooperation with the input module 610, the output module 615, or both. For example, the process orchestration layer 620 may receive information from the input module 610, send information to the output module 615, or be integrated in combination with the input module 610, the output module 615, or both to receive information, transmit information, or perform various other operations as described herein.

The process orchestration layer 620 may support data processing in accordance with examples disclosed herein. The attested code component 625 may be configured to support obtaining, at a process orchestration layer of a data processing system, an indication of code that has been approved by two or more parties of a secured sharing session. The stored procedure component 630 may be configured to support generating, by the process orchestration layer, a stored procedure including an initialization function, an output function, and a run function that includes the approved code. The call request component 635 may be configured to support outputting, from the process orchestration layer to a first sub-system of the data processing system associated with a first party of the two or more parties of the secured sharing session, a request that causes the first sub-system to execute the stored procedure.

The encrypted token component 640 may be configured to support receiving, at the process orchestration layer, an indication of an encrypted session token from the first sub-system in accordance with the initialization function of the stored procedure. The secret key component 645 may be configured to support validating the encrypted session token provided by the first sub-system based on using a secret key to decrypt the encrypted session token. The encrypted token component 640 may be configured to support providing the validated session token to a second sub-system of the data processing system associated with at least a second party of the two or more parties of the secured sharing session.

The row access component 650 may be configured to support accessing one or more rows of a dataset associated with the second party in accordance with the run function of the stored procedure based on comparing the validated session token to a list of authorized session identifiers associated with the dataset. The output table component 655 may be configured to support writing a result of the run function to a table in accordance with the output function of the stored procedure.

Figure 7:
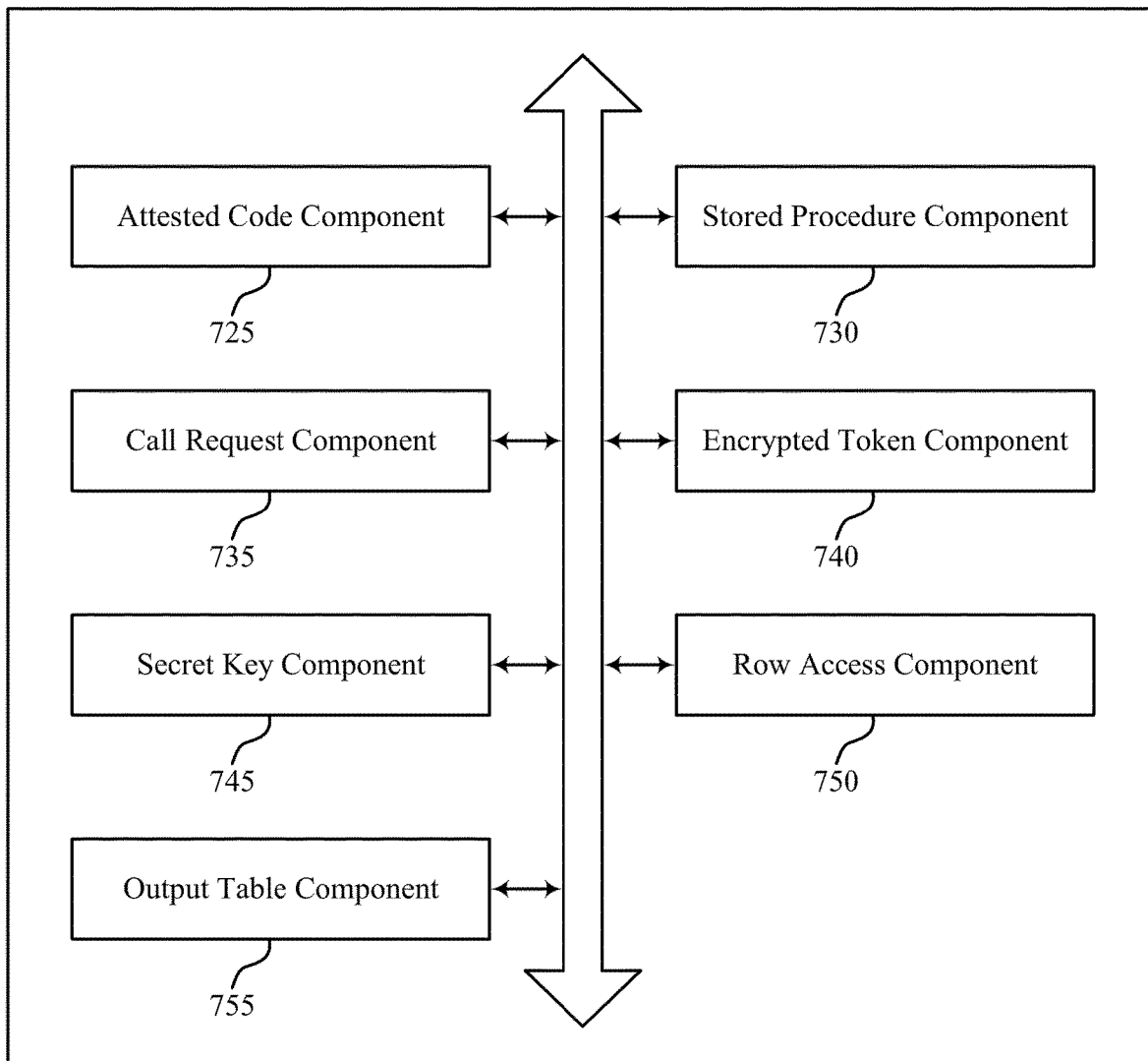
FIG. 7 shows a block diagram of a process orchestration layer that supports techniques for securely executing attested code in a collaborative environment in accordance with aspects of the present disclosure.

FIG. 7 shows a block diagram 700 of a process orchestration layer 720 that supports techniques for securely executing attested code in a collaborative environment in accordance with aspects of the present disclosure. The process orchestration layer 720 may be an example of aspects of a process orchestration layer or a process orchestration layer 620, or both, as described herein. The process orchestration layer 720, or various components thereof, may be an example of means for performing various aspects of techniques for securely executing attested code in a collaborative environment as described herein. For example, the process orchestration layer 720 may include an attested code component 725, a stored procedure component 730, a call request component 735, an encrypted token component 740, a secret key component 745, a row access component 750, an output table component 755, or any combination thereof. Each of these components may communicate, directly or indirectly, with one another (e.g., via one or more buses).

The process orchestration layer 720 may support data processing in accordance with examples disclosed herein. The attested code component 725 may be configured to support obtaining, at a process orchestration layer of a data processing system, an indication of code that has been approved by two or more parties of a secured sharing session. The stored procedure component 730 may be configured to support generating, by the process orchestration layer, a stored procedure including an initialization function, an output function, and a run function that includes the approved code.

The call request component 735 may be configured to support outputting, from the process orchestration layer to a first sub-system of the data processing system associated with a first party of the two or more parties of the secured sharing session, a request that causes the first sub-system to execute the stored procedure. The encrypted token component 740 may be configured to support receiving, at the process orchestration layer, an indication of an encrypted session token from the first sub-system in accordance with the initialization function of the stored procedure. The secret key component 745 may be configured to support validating the encrypted session token provided by the first sub-system based on using a secret key to decrypt the encrypted session token.

In some examples, the encrypted token component 740 may be configured to support providing the validated session token to a second sub-system of the data processing system associated with at least a second party of the two or more parties of the secured sharing session. The row access component 750 may be configured to support accessing one or more rows of a dataset associated with the second party in accordance with the run function of the stored procedure based on comparing the validated session token to a list of authorized session identifiers associated with the dataset. The output table component 755 may be configured to support writing a result of the run function to a table in accordance with the output function of the stored procedure.

In some examples, the encrypted session token provided by the first sub-system includes a session identifier, a data warehouse name, a task name, a timestamp, a hash value associated with a wrapping function of the stored procedure, a hash value of a task code, and a hash value associated with the run function of the stored procedure.

In some examples, the encrypted token component 740 may be configured to support generating the encrypted session token at the first sub-system of the data processing system using a secure hashing algorithm in accordance with the initialization function of the stored procedure.

In some examples, to support accessing the one or more rows of the dataset, the row access component 750 may be configured to support accessing the one or more rows of the dataset associated with the second party in accordance with a row access policy defined by the second party.

In some examples, the initialization function of the stored procedure includes a call to a secure function that returns the encrypted session token. In some examples, the table is accessible to the two or more parties of the secured sharing session. In some examples, data from the dataset associated with the second party is not exposed to other parties of the secured sharing session.

In some examples, the process orchestration layer provides the encrypted session token to each of the two or more parties of the secured sharing session. In some examples, the attested code component 725 may be configured to support verifying that the dataset is being accessed by the code running in the secured sharing session.

Figure 8:
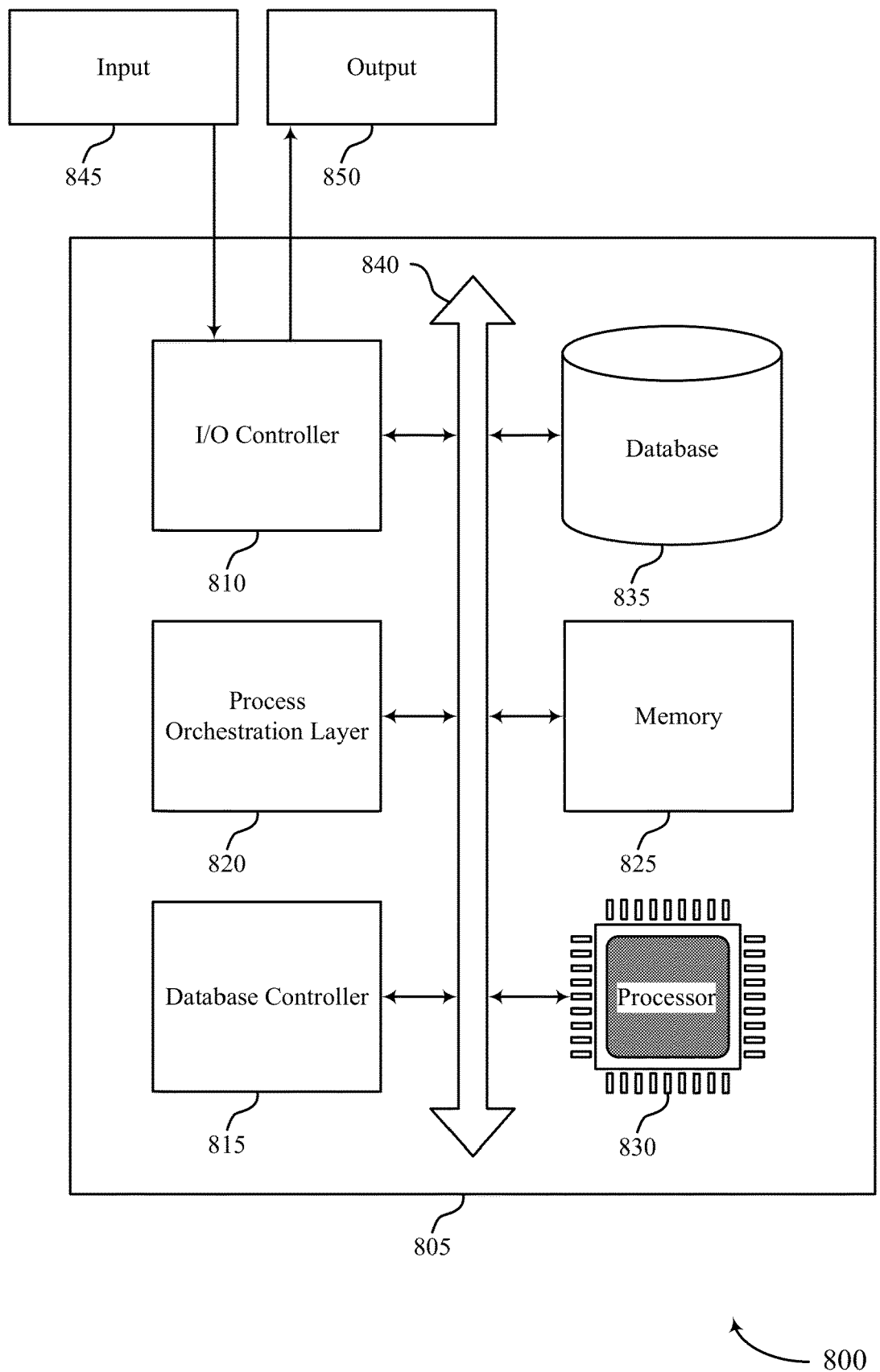
FIG. 8 shows a diagram of a system including a device that supports techniques for securely executing attested code in a collaborative environment in accordance with aspects of the present disclosure.

FIG. 8 shows a diagram of a system 800 including a device 805 that supports techniques for securely executing attested code in a collaborative environment in accordance with aspects of the present disclosure. The device 805 may be an example of or include the components of a device 605 as described herein. The device 805 may include components for bi-directional data communications including components for transmitting and receiving communications, such as a process orchestration layer 820, an input/output (I/O) controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor 830 to perform various functions described herein. In some cases, the memory 825 may contain, among other things, a basic I/O system (BIOS), which may control basic hardware or software operation such as the interaction with peripheral components or devices.

The processor 830 may include an intelligent hardware device, (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting techniques for securely executing attested code in a collaborative environment).

The process orchestration layer 820 may support data processing in accordance with examples disclosed herein. For example, the process orchestration layer 820 may be configured to support obtaining, at a process orchestration layer of a data processing system, an indication of code that has been approved by two or more parties of a secured sharing session. The process orchestration layer 820 may be configured to support generating, by the process orchestration layer, a stored procedure including an initialization function, an output function, and a run function that includes the approved code.

The process orchestration layer 820 may be configured to support outputting, from the processing orchestration layer to a first sub-system of the data processing system associated with a first party of the two or more parties of the secured sharing session, a request that causes the first sub-system to execute the stored procedure. The process orchestration layer 820 may be configured to support receiving, at the process orchestration layer, an indication of an encrypted session token from the first sub-system in accordance with the initialization function of the stored procedure. The process orchestration layer 820 may be configured to support validating the encrypted session token provided by the first sub-system based on using a secret key to decrypt the encrypted session token.

The process orchestration layer 820 may be configured to support providing the validated session token to a second sub-system of the data processing system associated with at least a second party of the two or more parties of the secured sharing session. The process orchestration layer 820 may be configured to support accessing one or more rows of a dataset associated with the second party in accordance with the run function of the stored procedure based on comparing the validated session token to a list of authorized session identifiers associated with the dataset. The process orchestration layer 820 may be configured to support writing a result of the run function to a table in accordance with the output function of the stored procedure.

By including or configuring the process orchestration layer 820 in accordance with examples as described herein, the system 800 may support techniques for improved user experience, data privacy, and query complexity by enabling collaborators to execute complex queries and/or perform additional processing on partner datasets without exposing actual data from the partner datasets. For example, the described techniques may enable collaborators in a data clean room to execute Python code that has been approved by all other collaborators in the data clean room, thereby providing data owners with a way to control who can access their data and how their data can be used. The techniques described herein may also leverage a combination of encryption techniques, secure functions, and row access policies to prevent collaborators from modifying or otherwise manipulating approved code in an unauthorized manner.

Figure 9:
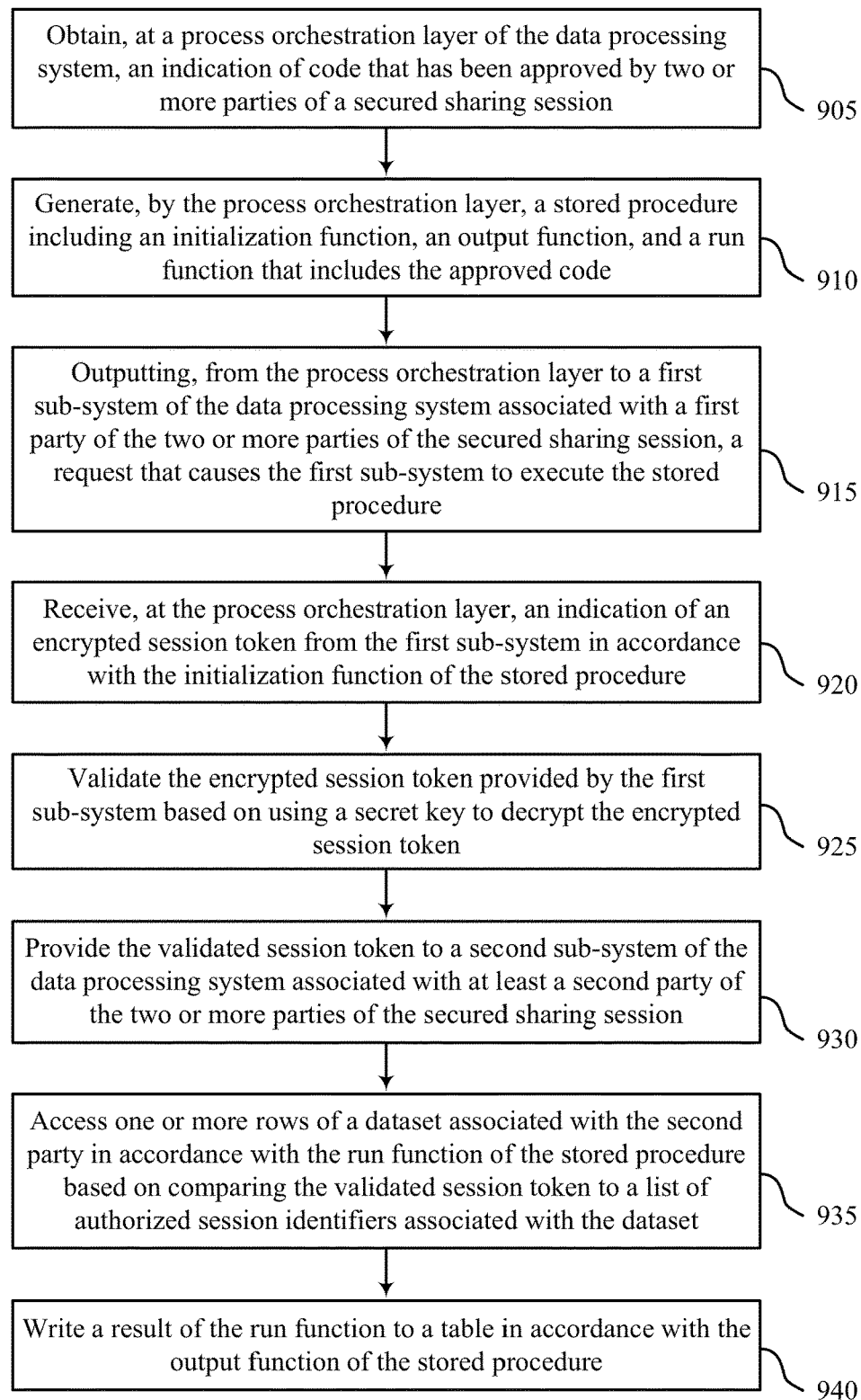
FIG. 9 shows a flowchart illustrating methods that support techniques for securely executing attested code in a collaborative environment in accordance with aspects of the present disclosure.

FIG. 9 shows a flowchart illustrating a method 900 that supports techniques for securely executing attested code in a collaborative environment in accordance with aspects of the present disclosure. The operations of the method 900 may be implemented by a data processing system or components thereof. For example, the operations of the method 900 may be performed by aspects of the data processing system 300, as described with reference to FIG. 3. In some examples, the data processing system may execute a set of instructions to control functional elements of the data processing system to perform the described functions. Additionally, or alternatively, the data processing system may perform aspects of the described functions using special-purpose hardware.

At 905, the method may include obtaining, at a process orchestration layer of the data processing system, an indication of code that has been approved by two or more parties of a secured sharing session. The operations of 905 may be performed in accordance with examples disclosed herein. In some examples, aspects of the operations of 905 may be performed by an attested code component 725, as described with reference to FIG. 7.

At 910, the method may include generating, by the process orchestration layer, a stored procedure including an initialization function, an output function, and a run function that includes the approved code. The operations of 910 may be performed in accordance with examples disclosed herein. In some examples, aspects of the operations of 910 may be performed by a stored procedure component 730, as described with reference to FIG. 7.

At 915, the method may include outputting, from the process orchestration layer to a first sub-system of the data processing system associated with a first party of the two or more parties of the secured sharing session, a request that causes the first sub-system to execute the stored procedure. The operations of 915 may be performed in accordance with examples disclosed herein. In some examples, aspects of the operations of 915 may be performed by a call request component 735, as described with reference to FIG. 7.

At 920, the method may include receiving, at the process orchestration layer, an indication of an encrypted session token from the first sub-system in accordance with the initialization function of the stored procedure. The operations of 920 may be performed in accordance with examples disclosed herein. In some examples, aspects of the operations of 920 may be performed by an encrypted token component 740, as described with reference to FIG. 7.

At 925, the method may include validating the encrypted session token provided by the first sub-system based on using a secret key to decrypt the encrypted session token. The operations of 925 may be performed in accordance with examples disclosed herein. In some examples, aspects of the operations of 925 may be performed by a secret key component 745, as described with reference to FIG. 7.

At 930, the method may include providing the validated session token to a second sub-system of the data processing system associated with at least a second party of the two or more parties of the secured sharing session. The operations of 930 may be performed in accordance with examples disclosed herein. In some examples, aspects of the operations of 930 may be performed by an encrypted token component 740, as described with reference to FIG. 7.

At 935, the method may include accessing one or more rows of a dataset associated with the second party in accordance with the run function of the stored procedure based on comparing the validated session token to a list of authorized session identifiers associated with the dataset. The operations of 935 may be performed in accordance with examples disclosed herein. In some examples, aspects of the operations of 935 may be performed by a row access component 750, as described with reference to FIG. 7.

At 940, the method may include writing a result of the run function to a table in accordance with the output function of the stored procedure. The operations of 940 may be performed in accordance with examples disclosed herein. In some examples, aspects of the operations of 940 may be performed by an output table component 755, as described with reference to FIG. 7.

A method for data processing is described. The method may include: obtaining, at a process orchestration layer of a data processing system, an indication of code that has been approved by two or more parties of a secured sharing session; generating, by the process orchestration layer, a stored procedure including an initialization function, an output function, and a run function that includes the approved code; outputting, from the process orchestration layer to a first sub-system of the data processing system associated with a first party of the two or more parties of the secured sharing session, a request that causes the first sub-system to execute the stored procedure; receiving, at the process orchestration layer, an indication of an encrypted session token from the first sub-system in accordance with the initialization function of the stored procedure; validating the encrypted session token provided by the first sub-system based on using a secret key to decrypt the encrypted session token; providing the validated session token to a second sub-system of the data processing system associated with at least a second party of the two or more parties of the secured sharing session; accessing one or more rows of a dataset associated with the second party in accordance with the run function of the stored procedure based on comparing the validated session token to a list of authorized session identifiers associated with the dataset; and writing a result of the run function to a table in accordance with the output function of the stored procedure.

An apparatus for data processing is described. The apparatus may include a processor, memory coupled with the processor, and instructions stored in the memory. The instructions may be executable by the processor to cause the apparatus to: obtain, at a process orchestration layer of a data processing system, an indication of code that has been approved by two or more parties of a secured sharing session; generate, by the process orchestration layer, a stored procedure including an initialization function, an output function, and a run function that includes the approved code; output, from the process orchestration layer to a first sub-system of the data processing system associated with a first party of the two or more parties of the secured sharing session, a request that causes the first sub-system to execute the stored procedure; receive, at the process orchestration layer, an indication of an encrypted session token from the first sub-system in accordance with the initialization function of the stored procedure; validate the encrypted session token provided by the first sub-system based on using a secret key to decrypt the encrypted session token; provide the validated session token to a second sub-system of the data processing system associated with at least a second party of the two or more parties of the secured sharing session; access one or more rows of a dataset associated with the second party in accordance with the run function of the stored procedure based on comparing the validated session token to a list of authorized session identifiers associated with the dataset; and write a result of the run function to a table in accordance with the output function of the stored procedure.

Another apparatus for data processing is described. The apparatus may include: means for obtaining, at a process orchestration layer of a data processing system, an indication of code that has been approved by two or more parties of a secured sharing session; means for generating, by the process orchestration layer, a stored procedure including an initialization function, an output function, and a run function that includes the approved code; means for outputting, from the process orchestration layer to a first sub-system of the data processing system associated with a first party of the two or more parties of the secured sharing session, a request that causes the first sub-system to execute the stored procedure; means for receiving, at the process orchestration layer, an indication of an encrypted session token from the first sub-system in accordance with the initialization function of the stored procedure; means for validating the encrypted session token provided by the first sub-system based on using a secret key to decrypt the encrypted session token; means for providing the validated session token to a second sub-system of the data processing system associated with at least a second party of the two or more parties of the secured sharing session; means for accessing one or more rows of a dataset associated with the second party in accordance with the run function of the stored procedure based on comparing the validated session token to a list of authorized session identifiers associated with the dataset; and means for writing a result of the run function to a table in accordance with the output function of the stored procedure.

A non-transitory computer-readable medium storing code for data processing is described. The code may include instructions executable by a processor to: obtain, at a process orchestration layer of a data processing system, an indication of code that has been approved by two or more parties of a secured sharing session; generate, by the process orchestration layer, a stored procedure including an initialization function, an output function, and a run function that includes the approved code; output, from the process orchestration layer to a first sub-system of the data processing system associated with a first party of the two or more parties of the secured sharing session, a request that causes the first sub-system to execute the stored procedure; receive, at the process orchestration layer, an indication of an encrypted session token from the first sub-system in accordance with the initialization function of the stored procedure; validate the encrypted session token provided by the first sub-system based on using a secret key to decrypt the encrypted session token; provide the validated session token to a second sub-system of the data processing system associated with at least a second party of the two or more parties of the secured sharing session; access one or more rows of a dataset associated with the second party in accordance with the run function of the stored procedure based on comparing the validated session token to a list of authorized session identifiers associated with the dataset; and write a result of the run function to a table in accordance with the output function of the stored procedure.

In some examples of the methods, apparatuses, and non-transitory computer-readable media described herein, the encrypted session token provided by the first sub-system includes a session identifier, a data warehouse name, a task name, a timestamp, a hash value associated with a wrapping function of the stored procedure, a hash value of a task code, and a hash value associated with the run function of the stored procedure.

Some examples of the methods, apparatuses, and non-transitory computer-readable media described herein may further include operations, features, means, or instructions for generating the encrypted session token at the first sub-system of the data processing system using a secure hashing algorithm in accordance with the initialization function of the stored procedure.

In some examples of the methods, apparatuses, and non-transitory computer-readable media described herein, accessing the one or more rows of the dataset may include operations, features, means, or instructions for accessing the one or more rows of the dataset associated with the second party in accordance with a row access policy defined by the second party.

In some examples of the methods, apparatuses, and non-transitory computer-readable media described herein, the initialization function of the stored procedure includes a call to a secure function that returns the encrypted session token.

In some examples of the methods, apparatuses, and non-transitory computer-readable media described herein, the table may be accessible to the two or more parties of the secured sharing session.

In some examples of the methods, apparatuses, and non-transitory computer-readable media described herein, data from the dataset associated with the second party may be not exposed to other parties of the secured sharing session.

In some examples of the methods, apparatuses, and non-transitory computer-readable media described herein, the process orchestration layer provides the encrypted session token to each of the two or more parties of the secured sharing session.

Some examples of the methods, apparatuses, and non-transitory computer-readable media described herein may further include operations, features, means, or instructions for verifying that the dataset may be being accessed by the code running in the secured sharing session.

The following provides an overview of aspects of the present disclosure:

Aspect 1: A method for data processing, comprising: obtaining, at a process orchestration layer of a data processing system, an indication of code that has been approved by two or more parties of a secured sharing session; generating, by the process orchestration layer, a stored procedure comprising an initialization function, an output function, and a run function that includes the approved code; outputting, from the process orchestration layer to a first sub-system of the data processing system associated with a first party of the two or more parties of the secured sharing session, a request that causes the first sub-system to execute the stored procedure; receiving, at the process orchestration layer, an indication of an encrypted session token from the first sub-system in accordance with the initialization function of the stored procedure; validating the encrypted session token provided by the first sub-system based at least in part on using a secret key to decrypt the encrypted session token; providing the validated session token to a second sub-system of the data processing system associated with at least a second party of the two or more parties of the secured sharing session; accessing one or more rows of a dataset associated with the second party in accordance with the run function of the stored procedure based at least in part on comparing the validated session token to a list of authorized session identifiers associated with the dataset; and writing a result of the run function to a table in accordance with the output function of the stored procedure.

Aspect 2: The method of aspect 1, wherein the encrypted session token provided by the first sub-system includes a session identifier, a data warehouse name, a task name, a timestamp, a hash value associated with a wrapping function of the stored procedure, a hash value of a task code, and a hash value associated with the run function of the stored procedure.

Aspect 3: The method of any of aspects 1 through 2, further comprising: generating the encrypted session token at the first sub-system of the data processing system using a secure hashing algorithm in accordance with the initialization function of the stored procedure.

Aspect 4: The method of any of aspects 1 through 3, wherein accessing the one or more rows of the dataset comprises: accessing the one or more rows of the dataset associated with the second party in accordance with a row access policy defined by the second party.

Aspect 5: The method of any of aspects 1 through 4, wherein the initialization function of the stored procedure includes a call to a secure function that returns the encrypted session token.

Aspect 6: The method of any of aspects 1 through 5, wherein the table is accessible to the two or more parties of the secured sharing session.

Aspect 7: The method of any of aspects 1 through 6, wherein data from the dataset associated with the second party is not exposed to other parties of the secured sharing session.

Aspect 8: The method of any of aspects 1 through 7, wherein the process orchestration layer provides the encrypted session token to each of the two or more parties of the secured sharing session.

Aspect 9: The method of any of aspects 1 through 8, further comprising: verifying that the dataset is being accessed by the code running in the secured sharing session.

Aspect 10: An apparatus for data processing, comprising: a processor; memory coupled with the processor; and instructions stored in the memory, wherein the instructions are executable by the processor to cause the apparatus to perform a method of any of aspects 1 through 9.

Aspect 11: An apparatus for data processing, comprising at least one means for performing a method of any of aspects 1 through 9.

Aspect 12: A non-transitory computer-readable medium storing code for data processing, the code comprising instructions executable by a processor to perform a method of any of aspects 1 through 9.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for secure multi-party data processing, comprising:

obtaining, at a process orchestration layer of a data processing system, an indication of code that has been approved by two or more independent parties of different organizations in a secured sharing session, wherein the approval comprises a collaborative approval requiring affirmative consent from each of the two or more parties;

generating, by the process orchestration layer, a stored procedure comprising an initialization function, an output function, and a run function that includes the approved code, wherein the stored procedure is configured to execute computations on datasets maintained by different parties without transferring raw data between the parties;

outputting, from the process orchestration layer to a first sub-system of the data processing system associated with a first party of the two or more parties of the secured sharing session, a request that causes the first sub-system to execute the stored procedure;

receiving, at the process orchestration layer, an indication of an encrypted session token from the first sub-system in accordance with the initialization function of the stored procedure;

validating the encrypted session token provided by the first sub-system based at least in part on using a secret key to decrypt the encrypted session token, wherein the validating step comprises verifying that the session token corresponds to an active multi-party sharing session, and confirming that the first party has authorization to execute the stored procedure on behalf of the secured sharing session;

providing the validated session token to a second sub-system of the data processing system associated with at least a second party of the two or more parties of the secured sharing session;

accessing one or more rows of a dataset associated with the second party in accordance with the run function of the stored procedure based at least in part on comparing the validated session token to a list of authorized session identifiers associated with the dataset, wherein the dataset remains inaccessible to the first party outside of the stored procedure execution;

performing computations specified in the run function on the accessed rows while maintaining data isolation between the first party and the second party; and writing a result of the run function to a table in accordance with the output function of the stored procedure, wherein the result comprises aggregated data that does not expose underlying raw data of the second party.

2. The method of claim 1, wherein the encrypted session token provided by the first sub-system includes a session identifier, a data warehouse name, a task name, a timestamp, a hash value associated with a wrapping function of the stored procedure, a hash value of a task code, and a hash value associated with the run function of the stored procedure.

3. The method of claim 1, further comprising: generating the encrypted session token at the first sub-system of the data processing system using a secure hashing algorithm in accordance with the initialization function of the stored procedure.

4. The method of claim 1, wherein accessing the one or more rows of the dataset comprises:

accessing the one or more rows of the dataset associated with the second party in accordance with a row access policy defined by the second party.

5. The method of claim 1, wherein the initialization function of the stored procedure includes a call to a secure function that returns the encrypted session token.

6. The method of claim 1, wherein the table is accessible to the two or more parties of the secured sharing session.

7. The method of claim 1, wherein the process orchestration layer provides the encrypted session token to each of the two or more parties of the secured sharing session.

8. The method of claim 1, further comprising: verifying that the dataset is being accessed by the code running in the secured sharing session.

9. An apparatus for data processing, comprising:
a processor;
memory coupled with the processor; and
instructions stored in the memory and executable by the processor to cause the apparatus to:
obtain, at a process orchestration layer of a data processing system, an indication of code that has been approved by two or more independent parties of different organizations in a secured sharing session, wherein the approval comprises a collaborative approval requiring affirmative consent from each of the two or more parties;
generate, by the process orchestration layer, a stored procedure comprising an initialization function, an output function, and a run function that includes the approved code, wherein the stored procedure is configured to execute computations on datasets maintained by different parties without transferring raw data between the parties;
output, from the process orchestration layer to a first sub-system of the data processing system associated with a first party of the two or more parties of the secured sharing session, a request that causes the first sub-system to execute the stored procedure;
receive, at the process orchestration layer, an indication of an encrypted session token from the first sub-system in accordance with the initialization function of the stored procedure;
validate the encrypted session token provided by the first sub-system based at least in part on using a secret key to decrypt the encrypted session token, wherein the validate process comprises verifying that the session token corresponds to an active multi-party sharing session, and confirming that the first party has authorization to execute the stored procedure on behalf of the secured sharing session;
provide the validated session token to a second sub-system of the data processing system associated with at least a second party of the two or more parties of the secured sharing session;
access one or more rows of a dataset associated with the second party in accordance with the run function of the stored procedure based at least in part on comparing the validated session token to a list of authorized session identifiers associated with the dataset, wherein the dataset remains inaccessible to the first party outside of the stored procedure execution;
perform computations specified in the run function on the accessed rows while maintaining data isolation between the first party and the second party; and
write a result of the run function to a table in accordance with the output function of the stored procedure, wherein the result comprises aggregated data that does not expose underlying raw data of the second party.

10. The apparatus of claim 9, wherein the encrypted session token provided by the first sub-system includes a session identifier, a data warehouse name, a task name, a timestamp, a hash value associated with a wrapping function of the stored procedure, a hash value of a task code, and a hash value associated with the run function of the stored procedure.

11. The apparatus of claim 9, wherein the instructions are further executable by the processor to cause the apparatus to: generate the encrypted session token at the first sub-system of the data processing system using a secure hashing algorithm in accordance with the initialization function of the stored procedure.

12. The apparatus of claim 9, wherein, to access the one or more rows of the dataset, the instructions are executable by the processor to cause the apparatus to:

access the one or more rows of the dataset associated with the second party in accordance with a row access policy defined by the second party.

13. The apparatus of claim 9, wherein the initialization function of the stored procedure includes a call to a secure function that returns the encrypted session token.

14. The apparatus of claim 9, wherein the table is accessible to the two or more parties of the secured sharing session.

15. The apparatus of claim 9, wherein data from the dataset associated with the second party is not exposed to other parties of the secured sharing session.

16. The apparatus of claim 9, wherein the process orchestration layer provides the encrypted session token to each of the two or more parties of the secured sharing session.

17. The apparatus of claim 9, wherein the instructions are further executable by the processor to cause the apparatus to:

verify that the dataset is accessed by the code running in the secured sharing session.

18. A non-transitory computer-readable medium storing code for data processing, the code comprising instructions executable by a processor to:

obtain, at a process orchestration layer of a data processing system, an indication of code that has been approved by two or more independent parties of different organizations in a secured sharing session, wherein the approval comprises a collaborative approval requiring affirmative consent from each of the two or more parties;

generate, by the process orchestration layer, a stored procedure comprising an initialization function, an output function, and a run function that includes the approved code, wherein the stored procedure is configured to execute computations on datasets maintained by different parties without transferring raw data between the parties;

output, from the process orchestration layer to a first sub-system of the data processing system associated with a first party of the two or more parties of the secured sharing session, a request that causes the first sub-system to execute the stored procedure;

receive, at the process orchestration layer, an indication of an encrypted session token from the first sub-system in accordance with the initialization function of the stored procedure;

validate the encrypted session token provided by the first sub-system based at least in part on using a secret key to decrypt the encrypted session token, wherein the validate step comprises verifying that the session token corresponds to an active multi-party sharing session, and confirming that the first party has authorization to execute the stored procedure on behalf of the secured sharing session;

provide the validated session token to a second sub-system of the data processing system associated with at least a second party of the two or more parties of the secured sharing session;

access one or more rows of a dataset associated with the second party in accordance with the run function of the stored procedure based at least in part on comparing the validated session token to a list of authorized session identifiers associated with the dataset, wherein the dataset remains inaccessible to the first party outside of the stored procedure execution;

perform computations specified in the run function on the accessed rows while maintaining data isolation between the first party and the second party; and write a result of the run function to a table in accordance with the output function of the stored procedure, wherein the result comprises aggregated data that does not expose underlying raw data of the second party.

19. The non-transitory computer-readable medium of claim 18, wherein the encrypted session token provided by the first sub-system includes a session identifier, a data warehouse name, a task name, a timestamp, a hash value associated with a wrapping function of the stored procedure, a hash value of a task code, and a hash value associated with the run function of the stored procedure.

* * * * *